United States Patent
Kirch et al.

(10) Patent No.: US 7,117,823 B2
(45) Date of Patent: *Oct. 10, 2006

(54) DOOR-MOUNTED TIE-OUT

(75) Inventors: Robert J. Kirch, Parker, CO (US); Richard A. Kraver, Miami Beach, FL (US)

(73) Assignee: Aspen Pet Products, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,226

(22) Filed: Dec. 5, 2005

(65) Prior Publication Data

US 2006/0081196 A1    Apr. 20, 2006

Related U.S. Application Data

(63) Continuation of application No. 10/625,585, filed on Jul. 22, 2003, now Pat. No. 6,978,737.

(51) Int. Cl.
*A01K 3/00* (2006.01)
*A01K 1/06* (2006.01)

(52) U.S. Cl. .................................... 119/769

(58) Field of Classification Search ............... 119/708, 119/769; 292/256.71, 258; 24/457, 486, 24/524, 568, 569, 570; 248/228.3
See application file for complete search history.

(56) References Cited

U.S. PATENT DOCUMENTS

| | | | |
|---|---|---|---|
| 2,042,086 A | 5/1936 | Aubert | 280/814 |
| 2,243,468 A | 5/1941 | Johnson | 33/649 |
| 2,470,318 A | 5/1949 | Nadelson | 160/368.1 |
| 2,568,940 A * | 9/1951 | Wolf | 73/774 |
| 3,258,821 A * | 7/1966 | Curran | 24/569 |
| 3,341,909 A | 9/1967 | Havener | 24/486 |
| 4,823,636 A * | 4/1989 | Suska | 24/569 |
| 5,404,602 A | 4/1995 | Kondo | 5/504.1 |
| 5,711,397 A | 1/1998 | Flora et al. | 182/3 |
| 5,829,391 A | 11/1998 | Krietzman et al. | 119/708 |
| 6,978,737 B1 * | 12/2005 | Kirch et al. | 119/769 |

* cited by examiner

*Primary Examiner*—Robert P. Swiatek
(74) *Attorney, Agent, or Firm*—Dorsey & Whitney LLP

(57) ABSTRACT

A tie-out that is attachable to a door and allows a user to secure an object or a pet to the door. When used with pets, the tie-out allows the user to connect a pet's leash to either side of a door without having to remove and reconfigure the tie-out, and is also configured to hold a pet's leash securely to a door without coming loose or damaging the door. Typically the tie-out is mounted to the bottom edge of the door, but may be mounted on a side edge of the door depending upon the design. In addition, the tie-out is not confined to use with doors located on the inside of a building and can be connected to doors that lead to the outside of a building.

16 Claims, 11 Drawing Sheets

DOOR-MOUNTED TIE-OUT

CROSS-REFERENCE TO RELATED APPLICATIONS

This application is a continuation patent application of U.S. patent application Ser. No. 10/625,585, filed on Jul. 22, 2003 now U.S. Pat. No. 6,978,737, and entitled "Door-Mounted Tie-Out", the disclosure of which is hereby incorporated herein in its entirety.

BACKGROUND OF THE INVENTION

1. Field of the Invention

This invention is generally related to tie-outs that allow objects or animals to be secured to a door, and more particularly, to door-mounted pet tie-outs that allow a user to tie a pet on either side of a door.

2. Background Art

Occasionally, pet owners want to restrict their pet's range of movement in various locations, such as on the inside or outside of their homes. There are various devices available to the pet owner to achieve this goal. For example, pet owners sometimes crate their pets in order to restrict their pet's ability to move freely about the inside of the pet owner's home. Although crates are effective in restricting the pet's ability to roam about, some pets become distraught when placed in a crate even for short periods of time. For example, a dog that does not want to be crated may resort to relentlessly barking or scratching the side of the crate in order to attract the pet owner's attention.

Other pet owners have resorted to using leashes to restrict a pet's range of movement inside their homes. Sometimes, pet owners secure one end of the leash to the pet and the other end to fixed or heavy object, such as a piece of furniture. For pets that do not react well to being crated, leashes may provide a good alternative for restricting a pet's movement. However, securing a pet with a leash to a piece of furniture has its drawbacks. For example, the leash can damage the furniture as the pet moves about the floor while dragging the leash. In addition, depending on the size of the pet and the piece of furniture to which it is secured, the pet may be able to drag the furniture across the floor or tip the furniture on its side. Some pet owners have also tried securing the pet's leash to a door handle. Again, depending on the size of the pet, the pet may be able to damage the door handle by pulling on the leash, as well as causing the door to open accidentally.

In order to restrict a pet's range of movement outside the home, some pet owners tie their pets' leashes to stakes placed in the ground. Typically, the stakes are located in a yard some distance away from the pet owner's house. Although a stake placed in the ground provides a secure object to which a pet's leash can be secured without easily coming loose, using a stake has some drawbacks. Sometimes a pet owner may have a need to restrain a pet when guests are visiting, but securing a dog to a stake in the middle of a yard can be a major inconvenience during periods of foul weather. This is because the pet owner usually has to escort the dog to where the stake is located in order to attach the leash. This can also prove inconvenient to a pet owner that is not properly attired to roam outside his or her household.

BRIEF SUMMARY OF THE INVENTION

The present invention provides a door-mounted tie-out that may be used in combination with, for example, a cable to secure an object, or a leash to secure a pet, to a door. The tie-out can act as a theft deterrent when it is used to secure an object to a door. When used to secure a pet, the tie-out not only acts as a theft deterrent, but also acts to confine a pet to a limited area adjacent to the door. The tie-out allows a user to secure a pet with a leash by connecting the leash to the tie-out and allows the user to connect a pet's leash to either side of the door. Because the tie-out can be relocated with ease, a user can move the tie-out from door to door inside a house with little difficulty. In one form of the invention, the pet owner may connect the pet's leash to either side of the door without having to remove and reconfigure the tie-out itself. The tie-out is also configured to hold a pet's leash securely to a door without coming loose or damaging the door. Typically the tie-out is mounted to the bottom of the door; however, the tie-out can also be mounted on the side of the door depending upon the design. In addition, the tie-out is not confined to use with doors located on the inside of a building and can be connected to doors that lead to the outside of a building.

In one aspect of the present invention, a tie-out mountable to a door comprises a base defining a U-shape including a first side, a second side, and a third side. The first side and the second side are connected with the third side. The first side also includes a ring hook, and the second side includes a screw bolt aperture. A first ring is connected with the ring hook. The tie-out also includes a screw bolt defining a first region and a second region, wherein a press platform is connected with the first region and a second ring is connected with the second region. The screw bolt is also threadedly engaged with the screw bolt aperture.

In another form, the present invention comprises a tie-out mountable to a door, the tie-out having a base including a first side, a second side, and a third side, wherein the third side interconnects the first side and the second side. A first ring is connected with the first side of the base, and a bolt is threadedly engaged with the second side of the base. A second ring and a press platform are connected with the bolt.

In yet another form, a tie-out mountable to a door comprises a base, a pressing mechanism adjustably connected with the base, and at least one ring connected with one of the base and the pressing mechanism. The tie-out base can comprise a first side, a second side, and a third side, wherein the third side forms a bridge between the first side and the second side. The tie-out can also include a hook connected with the first side, and at least one ring connected with the hook. The pressing mechanism may comprise a screw bolt, wherein the screw bolt is threadedly engaged with the base, and a press platform connected with the screw bolt. A base pad may be connected with the first side, and a platform pad may be connected with the press platform. The screw bolt may also be threadedly engaged with a nut connected with the base.

The features, utilities, and advantages of various embodiments of the invention will be apparent from the following more particular description of embodiments of the invention as illustrated in the accompanying drawings and defined in the appended claims.

DETAILED DESCRIPTION OF THE INVENTION

Figure 1:
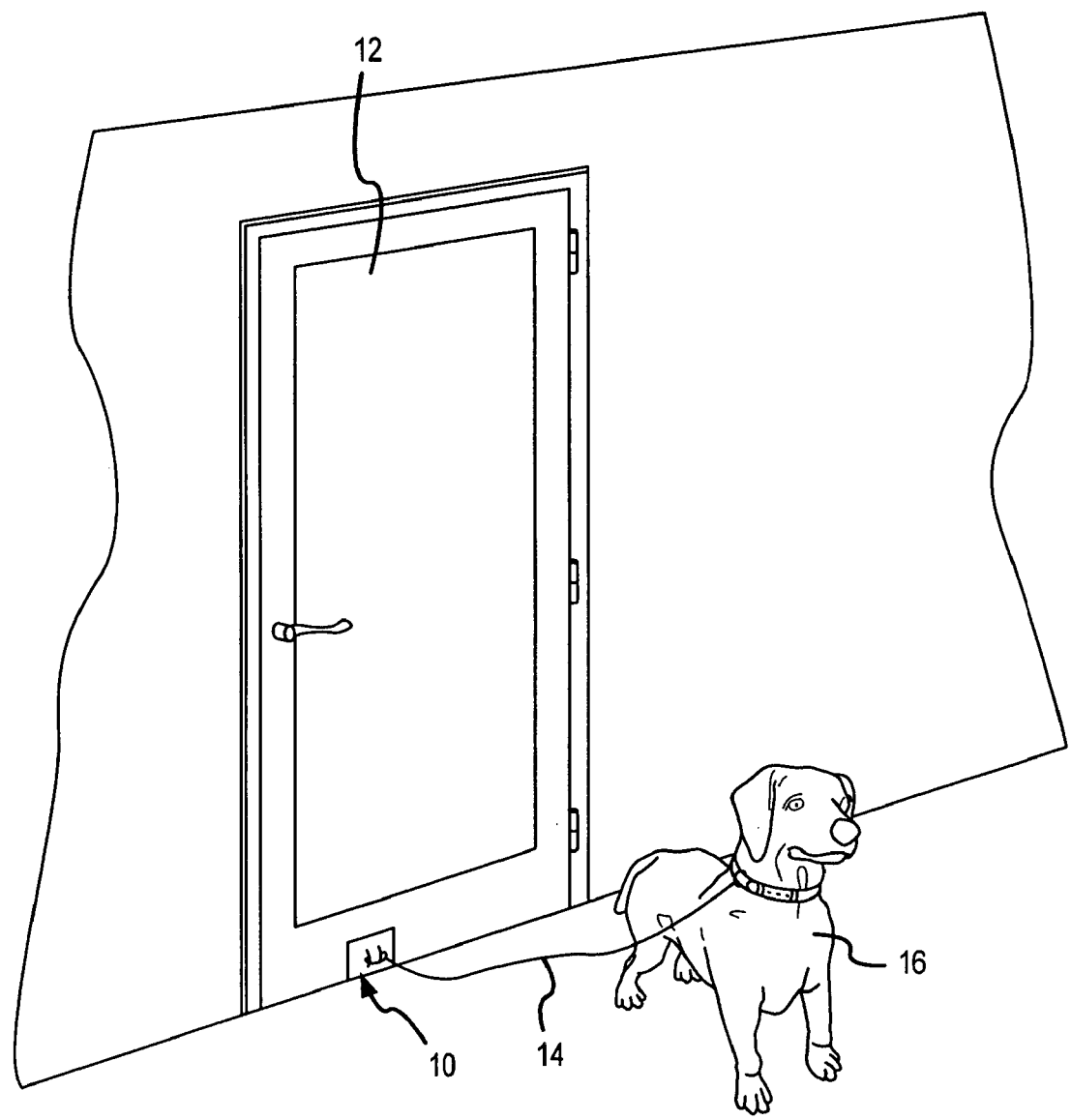
FIG. 1 is an isometric view of a tie-out mounted to a door.

The present invention is a door-mounted tie-out 10 that may be secured to interior or exterior doors 12, including walk doors, overhead garage doors, swinging doors, and sliding doors. The tie-out 10 may be used in combination with, for example, a cable (not shown) to secure an object (e.g., a motorcycle, a bicycle, patio furniture, a cooler, or a trailer) or a leash 14 to secure a pet 16 to the door 12. When used to secure an object, the tie-out acts as a theft deterrent. When used to secure a pet 16, the tie-out acts as a theft deterrent and also gives the pet owner comfort that the pet cannot wander off.

FIG. 1 shows a tie-out 10 according to the present invention secured to a door 12 and being used as a pet tie-out to confine a pet 16 to a limited area adjacent to the door 12. As shown in FIG. 1, a dog 16 is secured to the door 12 with a leash 14 that is connected to the tie-out 10. Although a dog is depicted in FIG. 1, the present invention can function with other pets. In FIG. 1, the tie-out 10 is mounted to the bottom of the door; however, the tie-out 10 can also be mounted on the side of the door depending on the design utilized.

Figure 2:
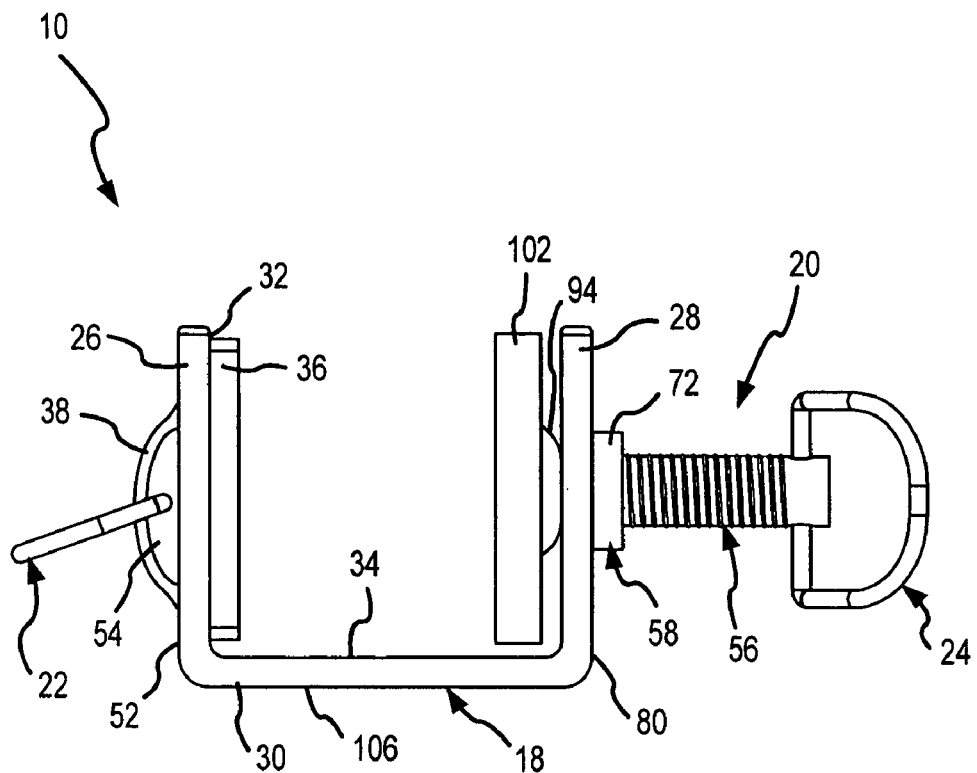
FIG. 2 is a left side view of a tie-out according to one embodiment of the present invention, shown in a fully-opened position.
Figure 3:
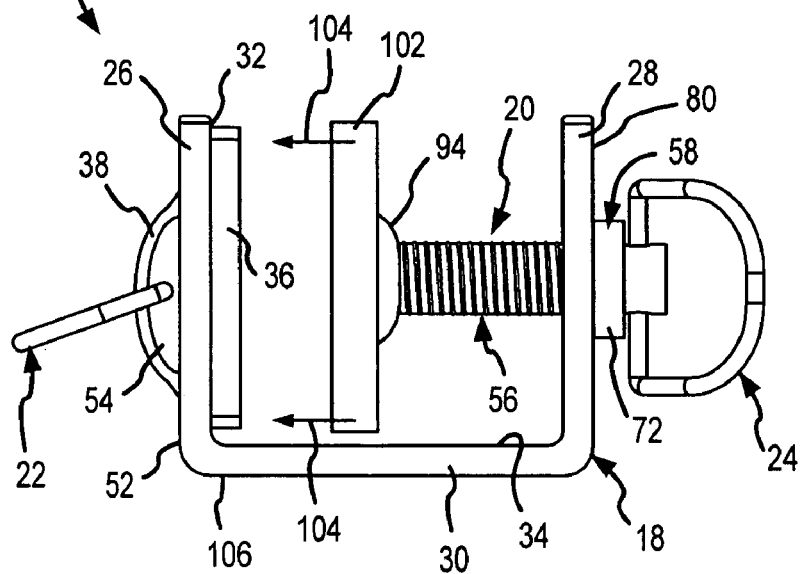
FIG. 3 is a left side view of the tie-out of FIG. 2, shown in a fully-closed position.

FIG. 2 shows a left side view of a tie-out 10 according to one embodiment of the present invention in a fully-opened position, and FIG. 3 shows a left side view of the same tie-out 10 in a fully-closed position. As shown in FIGS. 2 and 3, the tie-out 10 includes a tie-out base 18, a pressing mechanism 20, a first ring 22, and a second ring 24. As discussed in more detail below, the pressing mechanism 20 presses the tie-out base 18 against a door 12 in order to secure the tie-out 10 to the door 12. Once the tie-out 10 is secured to the door 12, the first ring 22 is located one side of door and the second ring 24 is located on the opposite side of the door. The first ring 22 or the second ring 24 is connected to the pet's leash 14. Because the first ring 22 and the second ring 24 are located on opposite sides of the door, the tie-out 10 allows a user to secure his or her pet 16 to either side of the door without having to remove or reconfigure the tie-out 10. Other embodiments of the tie-out are configured with only one ring.

Figure 4:
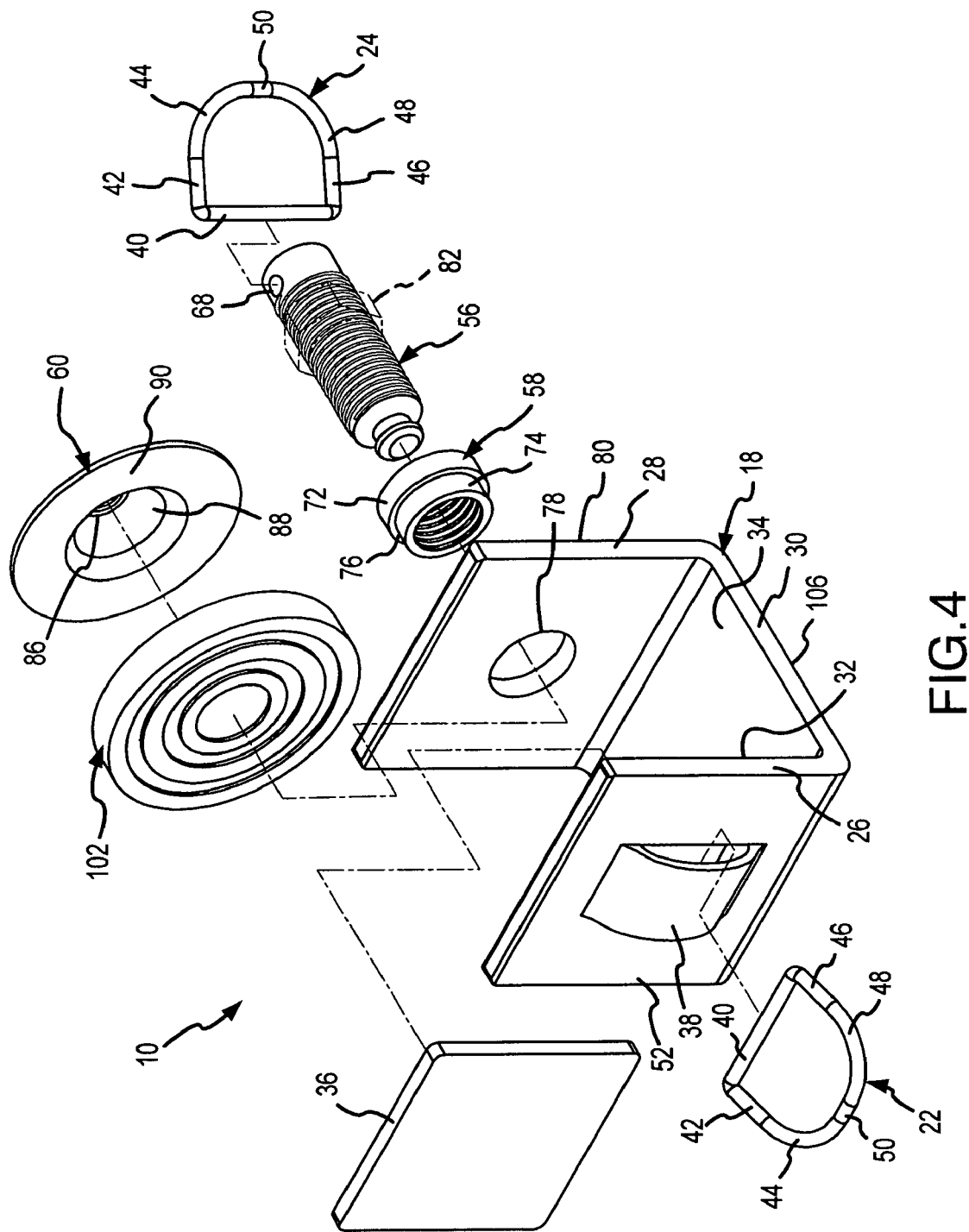
FIG. 4 is an exploded, isometric view of the tie-out of FIGS. 2 and 3.
Figure 5:
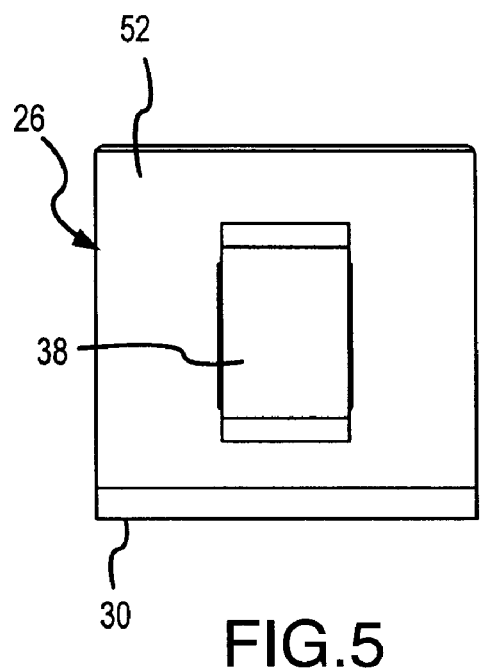
FIG. 5 is a front view of a base of the tie-out of FIGS. 2–4.
Figure 7:
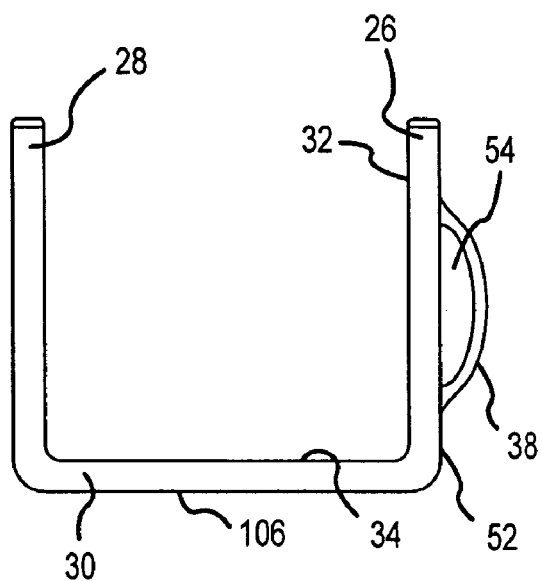
FIG. 7 is a right side view of the base of the tie-out of FIGS. 2–6.
Figure 6:
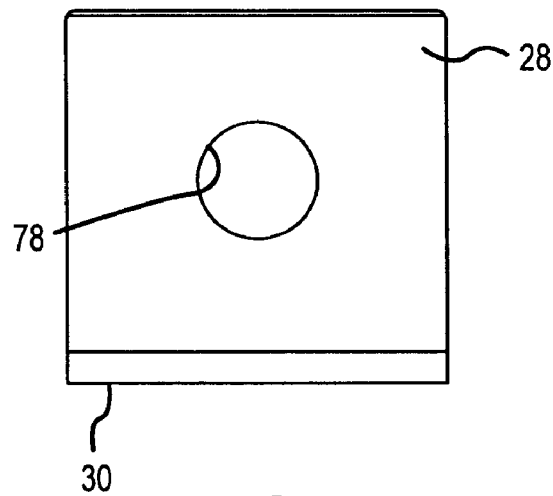
FIG. 6 is a rear view of the base of the tie-out of FIGS. 2–5.

FIG. 4 shows an exploded, isometric view of the tie-out 10 depicted in FIGS. 2 and 3. FIGS. 5–7 show a front view, a rear view, and a right side view of the tie-out base 18, respectively. In the embodiment shown in FIGS. 4–7, the tie-out base 18 is constructed from a single piece of material that is bent to define a U-shape including a first side 26, a second side 28, and a third side 30. In alternative embodiments, the base 18 is constructed from separate pieces of material that are connected with each other by any suitable means, such as screws, welding, or adhesives. The tie-out base 18 is configured such that the first side 26 and the second side 28 connect with and are separated by the third side 30. The first side 26 and the second side 28 are generally parallel to each other and both connect with the third side 30. The tie-out base 18 is typically made from metal, such as aluminum or steel, but other materials may be also be used, such as plastic. When installed on a door 12, an inner surface 32 of the first side 26 of the tie-out base 18 is drawn toward one side of the door 12, and the inner surface 34 of the third side 30 is typically positioned adjacent to the bottom of the door 12 although it need not be in contact with the bottom of the door. Typically, the second side 28 is adjacent to, but not in contact with, the opposite side of the door. However, in an alternative embodiment, discussed in more detail below with reference to FIGS. 11A and 11B, the second side 28' is flush with the opposite side of the door.

As shown in FIG. 4, the tie-out 10 can also include a base pad 36 to protect the door 12 from damage such as scratches or dents. When the tie-out 10 is installed on the door 12, the base pad 36 is positioned between the inner surface 32 of the first side 26 of the tie-out base 18 and the door 12. The base pad 36 can be connected with the first side of the tie-out base 26 by any suitable means, such as screws, glue, or hook-and-loop fasteners. Typically, the base pad 36 is made from rubber, but other suitable materials can also be used, such as fabric, plastic, and the like.

As shown in FIGS. 2–4, the first ring 22 connects with the tie-out base 18 on a ring hook 38 located on the first side 26 of the tie-out base 18. The second ring 24 connects with the pressing mechanism 20. As depicted in FIG. 4, the first ring 22 and the second ring 24 define a D-shape including a base portion 40, a first side portion 42, a first arcuate portion 44, a second side portion 46, a second arcuate portion 48, and a third side portion 50. The base portion 40 is generally a straight cylindrical shape with one of its ends connected to the first side portion 42, and the other of its ends connected to the second side portion 46. The first side portion 42 and the second side portion 46 extend from the base portion 40 generally parallel to each other. The first arcuate portion 44 and second arcuate portion 48 extend from the first side portion 42 and the second side portion 46, respectively. The first arcuate portion 44 and the second arcuate portion 48 curve toward each other until they intersect with the third side portion 50 as shown in FIG. 4. The D-shape allows the pet's leash 14 to more easily slide around the perimeter of the rings 22, 24 as the pet roams about while attached to the leash. The shape of the first ring 22 and second ring 24 should not be construed to be limited to that which is depicted herein. For example, other embodiments utilize circular or oval shaped rings.

The first ring 22 and second ring 24 each can be constructed from a single piece of material with a circular cross-section that is bent into shape. In other embodiments (not shown), the first ring and the second ring are constructed of more than one connected piece. Because a pet's leash connects with the first ring or the second ring, the thickness and the material from which the first ring and second ring are constructed can be chosen based on the application to minimize the risk that the rings will break because of the forces exerted on it from the pet's leash. Typically, the rings are constructed from steel or aluminum. However, alternative materials can be used, such as plastic.

As shown in FIGS. 2–4 and 7, the ring hook 38 is an arcuate-shaped piece of material protruding from an outer surface 52 of the first side 26 of the tie-out base 18. The ring hook 38 protrudes far enough from the outer surface 52 of the first side 26 of the tie-out base 18 to create a gap 54 large enough to accept the base portion 40 of the first ring 22 as shown to good advantage in FIGS. 2, 3, and 7. This configuration allows the first ring 22 to rotate about the base portion 40 when connected with the ring hook 38. Other embodiments of the present invention do not require the first ring, because a user can connect a pet's leash directly to the ring hook 38.

Figure 8:
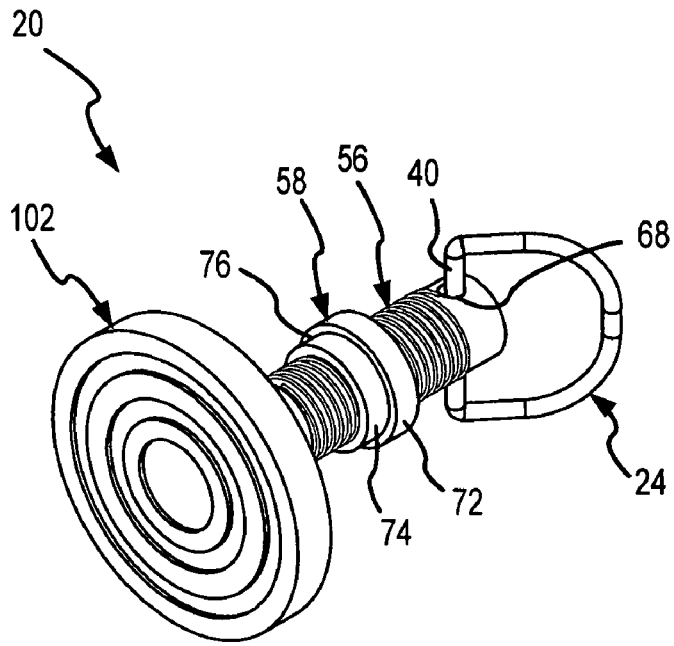
FIG. 8 is an assembled, isometric view of a pressing mechanism of the tie-out of FIGS. 2–4.
Figure 9:
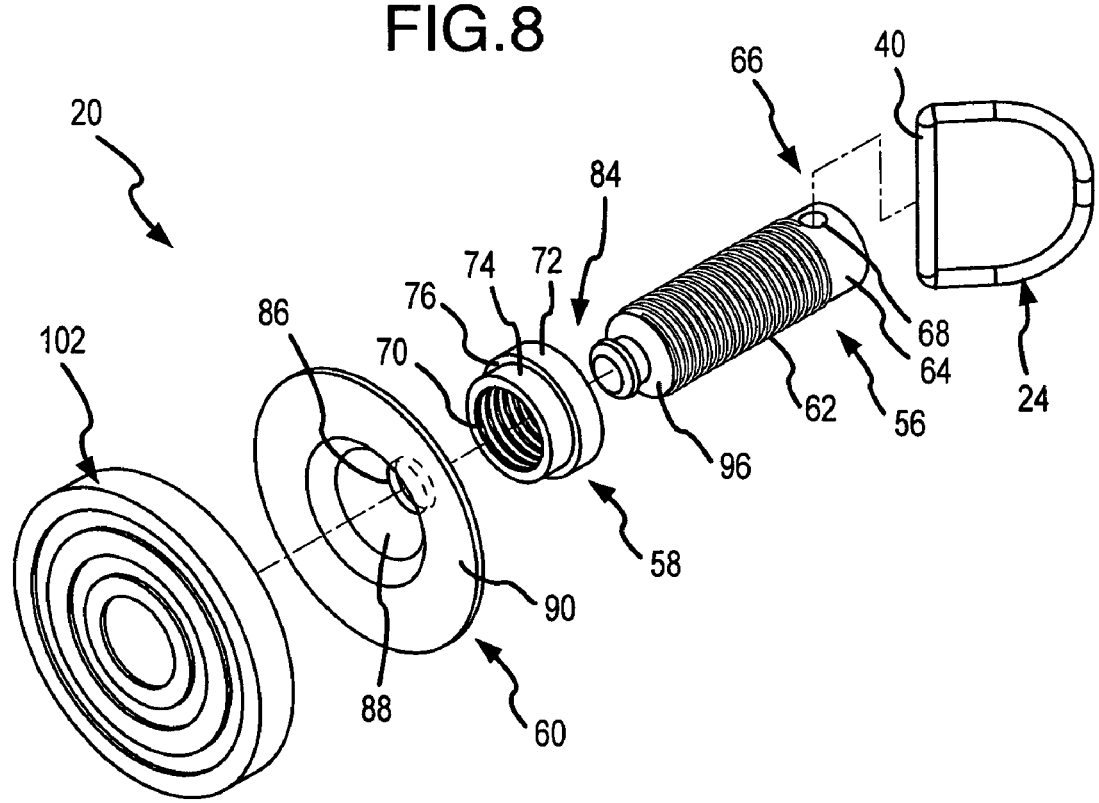
FIG. 9 is an exploded, isometric view of the pressing mechanism of the tie-out depicted in FIG. 8.

FIG. 8 is an assembled, isometric view of the pressing mechanism 20 that is also depicted in FIGS. 2–4, with the second ring 24 connected thereto. FIG. 9 is an exploded, isometric view of the pressing mechanism 20 and the second ring 24. The pressing mechanism 20 includes a screw bolt 56, a nut 58, and a press platform 60. The screw bolt 56 is generally cylindrical in shape and is surrounded by threads 62. A shank 64 is located toward a first end 66 of the screw bolt 56. A ring hole 68 is located in the screw bolt 56 through the shank 64. The ring hole 68 is large enough to accept the base portion 40 of the second ring 24, as shown in FIG. 8. This configuration allows the second ring 24 to rotate about its base portion 40 when connected with the screw bolt 56.

As shown in FIGS. 2–4, the screw bolt 56 is threadedly engaged with the nut 58. Referring now to FIG. 9, the nut 58 is shaped like a hollow cylinder with threads 70 on the inside and having a first outer surface 72, a second outer surface 74, and a ring surface 76. The diameter of the first outer surface 72 is larger than the diameter of the second outer surface 74. The ring surface 76 is generally flat and extends perpendicularly between the first outer surface 72 and the second outer surface 74. The nut 58 is connected with the tie-out base 18 by inserting the nut 58 through a screw bolt aperture 78 (see, e.g., FIGS. 4 and 6) in the second side 28 of the tie-out base 18 until the ring surface 76 is flush with an outer surface 80 of the second side 28, as shown in FIGS. 2 and 3. The diameter of the second outer surface 74 of the nut 58 is slightly smaller than the diameter of the screw bolt aperture 78 so the nut 58 fits snuggly inside the screw bolt aperture 78. The nut 58 is affixed to the tie-out base 18 utilizing welding, glue, screws, or other similar fastening techniques. In an alternative embodiment (not shown), the nut is not required because the screw bolt aperture is itself threaded to accept the screw bolt directly. A locking or jamming nut 82, as depicted in phantom in FIG. 4, can also be used for added security to help prevent the inadvertent loosening of the screw bolt 56.

Figure 10A:
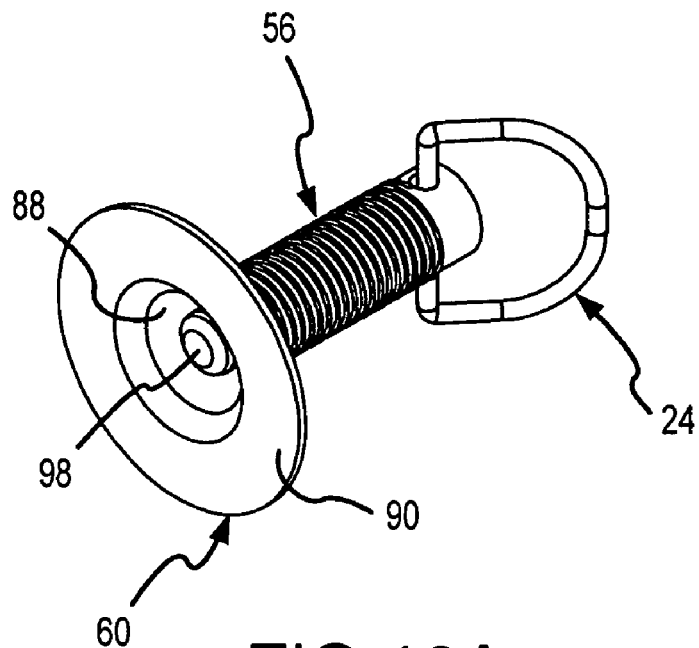
FIG. 10A is an isometric view of an assembled press platform, screw bolt, and second ring of the tie-out depicted in FIG. 8.
Figure 10B:
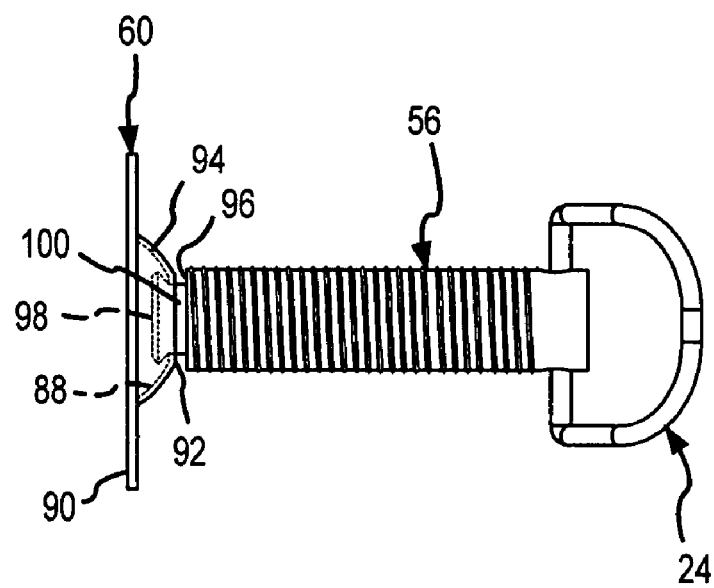
FIG. 10B is a side view of an assembled press platform, screw bolt, and second ring of the tie-out depicted in FIG. 8.

Referring again to FIG. 9, the press platform 60 connects with a second end 84 of the screw bolt 56. The press platform 60 is generally disk shaped with a tip aperture 86 located in its center. A concave surface 88 extends outwardly and forwardly from the tip aperture 86 of the press platform 60. The concave surface 88 of the press platform 60 connects with a flat ring-shaped press surface 90. The second end 84 of the screw bolt 56 fits through the tip aperture 86 in the center of the press platform 60 until a rearward side 92 of a convex surface 94 of the press platform 60 is adjacent to a shoulder surface 96 on the screw bolt 56, as shown in FIGS. 10A and 10B. In FIGS. 10A and 10B, the screw bolt 56, the second ring 24, and the press platform 60 have been broken away from the tie-out base 18 for clarity. Also, the nut 58 is not shown on the screw bolt 56. With the second end 84 of the screw bolt 56, through the tip aperture 86, the second end 84 of the screw bolt 56 is then secured to the press platform 60 by deforming the second end 84 of the screw bolt 56 to form a pressed tip 98 and a neck 100. The outer diameter of the pressed tip 98 is larger than the diameter of the tip aperture 86 so as to prevent the press platform 60 from separating from the screw bolt 56. The neck 100 of the screw bolt 56 fits loosely inside the tip aperture 86 so that the press platform 60 is not required to turn with the screw bolt 56 as it is rotated to either mount the tie-out to, or remove the tie-out from, a door. In addition, the concave surface 88 is deep enough that the pressed tip 98 is located rearwardly of the press surface 90 as shown to good advantage in FIG. 10B (i.e., on the same side of the press surface 90 as the second ring 24).

As shown in FIGS. 8 and 9, the pressing mechanism 20 can include a platform pad 102 to protect the door 12 from damage such as scratches or dents. The platform pad 102 connects with the press platform 60. As shown in FIGS. 2 and 3, the platform pad 102 is configured to be installed so that it envelopes the press surface 90 and the outer diameter of the press platform 60, which also holds the platform pad 102 in position. In other embodiments, the platform pad 102 can be connected with the press platform 60 by any suitable means, such as screws, glue, or hook-and-loop fasteners. When the tie-out 10 is installed on a door 12, the platform pad 102 is positioned between the press surface 90 and the door 12. Typically, the platform pad 102 is made from rubber, but other suitable materials can also be used, such as fabric, plastic, and the like.

When installing the tie-out 10 to a door 12, a user unscrews the screw bolt 56 by turning the second ring 24 to expand the distance between the press platform 60 and the first side 26 of the tie-out base 18 far enough to accept the width of the door. This feature allows the invention to fit many different doors with varying thicknesses. The tie-out 10 is then positioned, for example, under the door so that the door fits between the press platform 60 and the first side 26 of the tie-out base 18. The user then screws the screw bolt 56 in the opposite direction using the second ring 24, which in turn causes the press platform 60 to move in the direction of arrows 104 (FIG. 3) to press the door 12 against the first side 26 of the tie-out base 18 until it is tight enough so as not to easily come loose. As previously discussed, the inner surface 34 of the third side 30 is typically positioned adjacent to the bottom of the door although it need not be in contact with the bottom of the door. However, the inner surface 34 of the third side 30 should be located close enough to the bottom of the door so as to prevent an outer surface 106 of the third side 30 from dragging on the floor as the door is opened and closed. Once the tie-out 10 is in place on the door, the user can secure his pet to the first ring 22 or the second ring 24.

Other embodiments of the present invention utilize pressing mechanisms with other configurations for applying pressure to the door in order to hold the tie-out base in position.

Figure 11A:
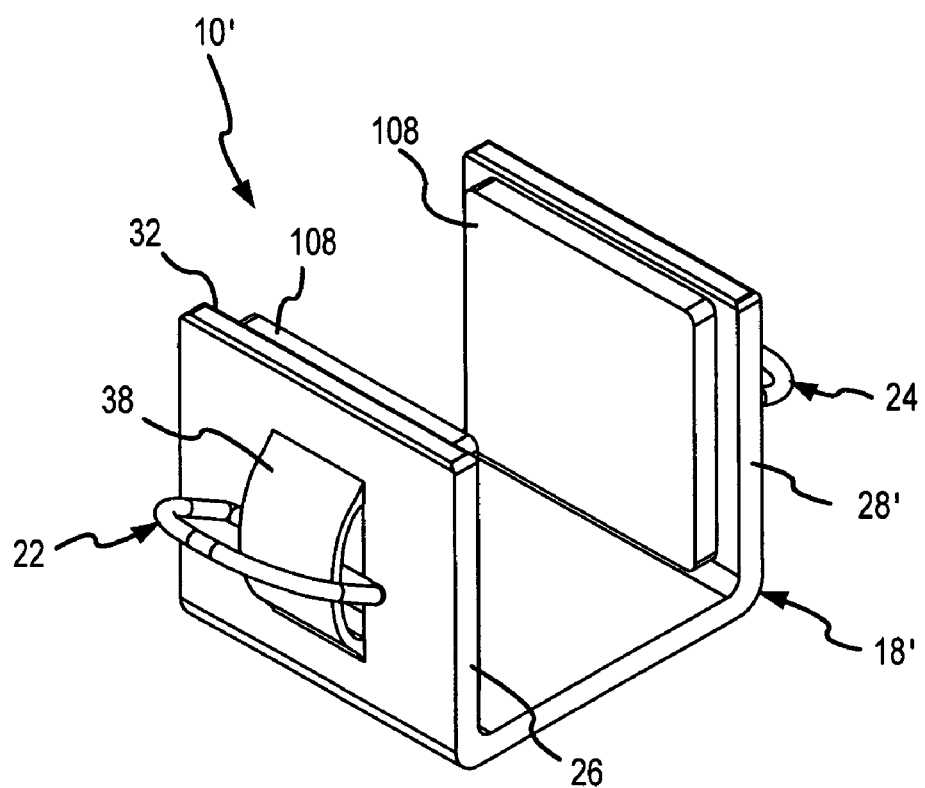
FIG. 11A is an isometric view of a first alternative embodiment of a tie-out according to the present invention.
Figure 11B:
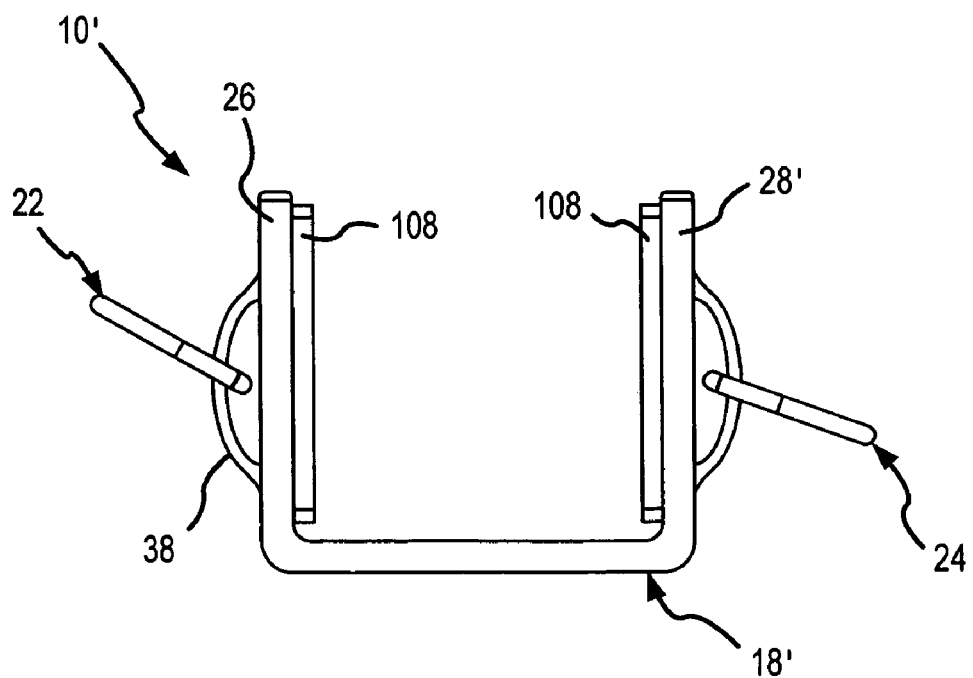
FIG. 11B is a side view of the tie-out depicted in FIG. 11A.

A first alternative embodiment of a tie-out 10' is shown in FIGS. 11A and 11B. The first side 26 of the tie-out base 18' is the same as previously described with reference to FIGS. 1–9. Unlike the second side 28 described with reference to FIGS. 1–9, a second side 28' of the tie-out base 18' shown in FIGS. 11A and 11B is a mirror image of the first side 26.

In order to secure the tie-out 10' to a door 12, a user places shim pads 108 between the tie-out base 18' and the door 12 so that the tie-out base 18'is held in position with friction. Shim pads 108 can be located between either the first side 26 or second side 28' and the door 12, or between both sides and the door. These shim pads 108 are similar to the base pad 36 depicted in, for example, FIGS. 2–4, but may be used alone or in multiples.

Figure 12:
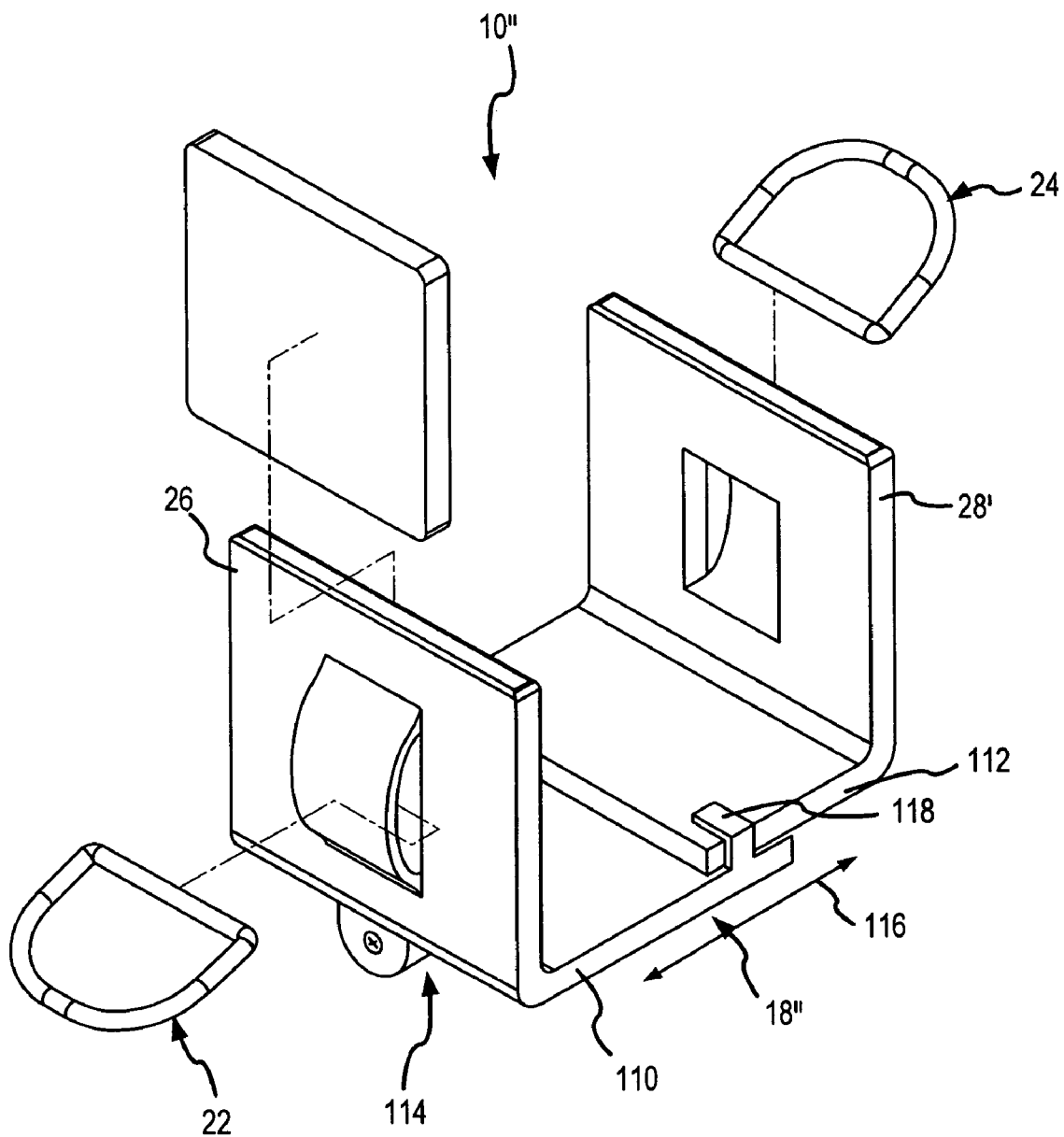
FIG. 12 is an exploded isometric view of a second alternative embodiment of a tie-out according to the present invention.

A second alternative embodiment of a tie-out 10" is shown in FIG. 12. The first side 26 and the second side 28' of the second alternative embodiment of the tie-out 10" are the same as previous described with reference to FIGS. 11A and 11B. However, the tie-out base 18" comprises a first piece 110 and a second piece 112. A screw and nut arrangement 114 located under the tie-out base 18" allows a user to adjust the tie-out width along the direction of arrow 116 when securing the tie-out 10" to a door 12. The first piece 110 also includes tabs 118 (one of which is shown in FIG. 12) to hold the pieces 110, 112 in alignment when the pieces 110, 112 move relative to each other when adjusting the tie-out width in the direction of arrow 116. Because the screw and nut arrangement 114 is located on the bottom side of the tie-out base 18", additional clearance may be required under the door to prevent the tie-out 10" from contacting the floor as the door is opened or closed.

Figure 13:
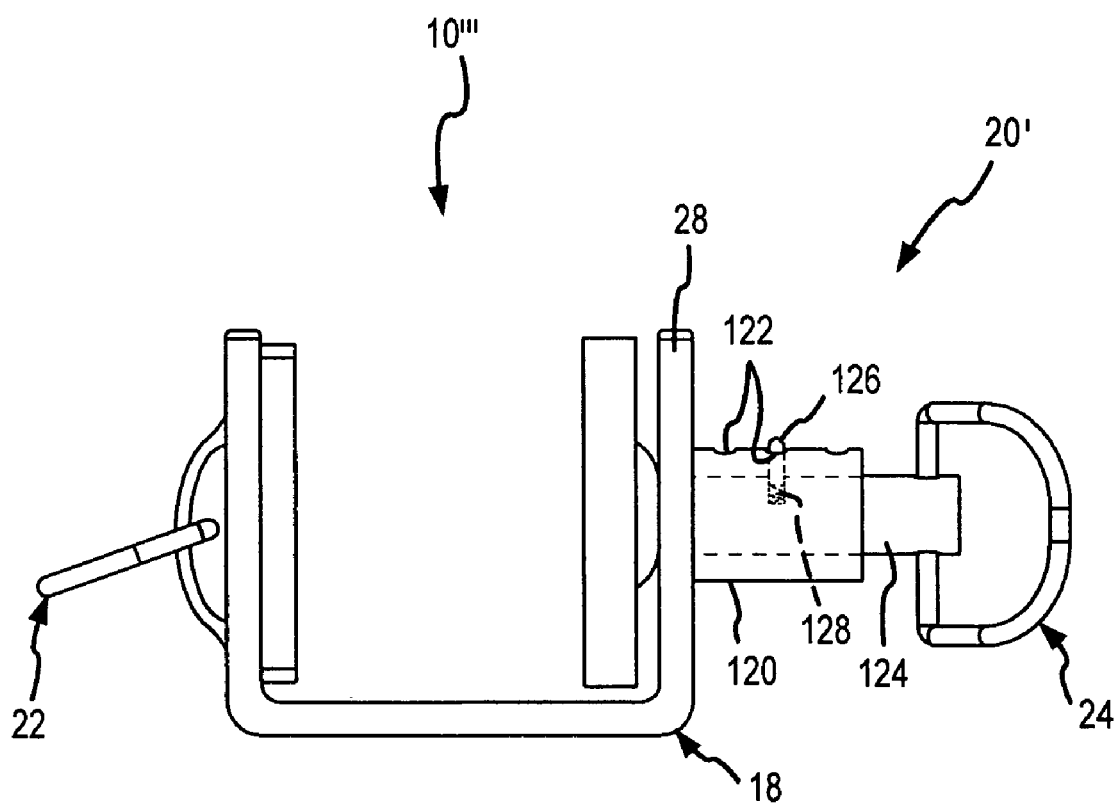
FIG. 13 is a left side view of a third alternative embodiment of a tie-out according to the present invention.

A third alternative embodiment of a tie-out 10'" is shown in FIG. 13. Unlike the embodiment described with reference to FIGS. 1–9, the pressing mechanism 20' shown in FIG. 13 is not threadedly engaged with the second side 28 of the tie-out base 18. The tie-out base 18 shown in FIG. 13 includes a tube 120 extending outwardly from the second side 28. A plurality of holes 122 are located along the length of the tube 120. Instead of using the screw bolt 56 as previously described, the pressing mechanism 20' shown in FIG. 13 utilizes a shaft 124 that slides in and out of the tube 120. The shaft 124 is held in a desired position by a depressible button 126 protruding from the exterior surface of the shaft 124 that is configured to fit in any one of the holes 122 located along the length of the tube 120. To adjust the position of the shaft 124, the user presses the button 126 into the shaft 124 until the button is free from engagement with the holes 122, allowing the shaft 124 to slide in and out of the tube 120. The depressible button 126 is biased by, for example, a spring 128 into engagement with one of the holes 122 through the tube 120. Thus, when the shaft is slid to a position where the depressible button 126 and one of the plurality of holes 122 are in alignment, the spring 128 causes the button 126 to move outwardly from the shaft 124 and into one of the holes 122, which locks the shaft 124 into position relative to the tie-out base 18".

Figure 14:
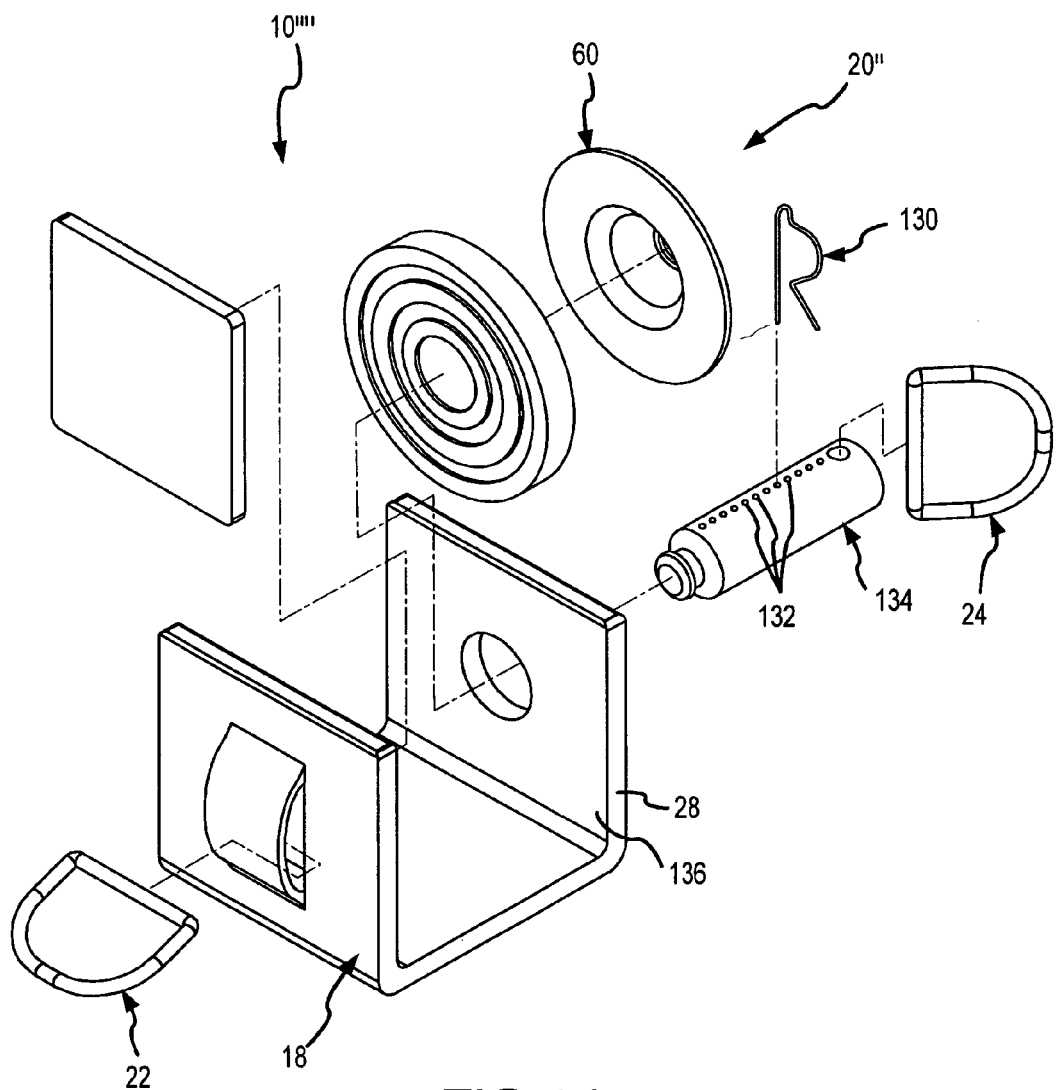
FIG. 14 is an exploded isometric view of a fourth alternative embodiment of a tie-out according to the present invention.

A fourth alternative embodiment of a tie-out 10"" is shown in FIG. 14. Unlike the embodiment described with reference to FIG. 13, the pressing mechanism 20" utilizes a pin 130 to hold the pressing mechanism 20" in a desired position. When installing the tie-out 10"", the user applies force to the pressing mechanism 20" until the press platform 60 is held firmly against the door 12. The user then slides the pin 130 through one of a plurality of holes 132 located along the length of a shaft 134 such that the pin 130 abuts the inner surface 136 of the second side 28 of the base 18.

Figure 15:
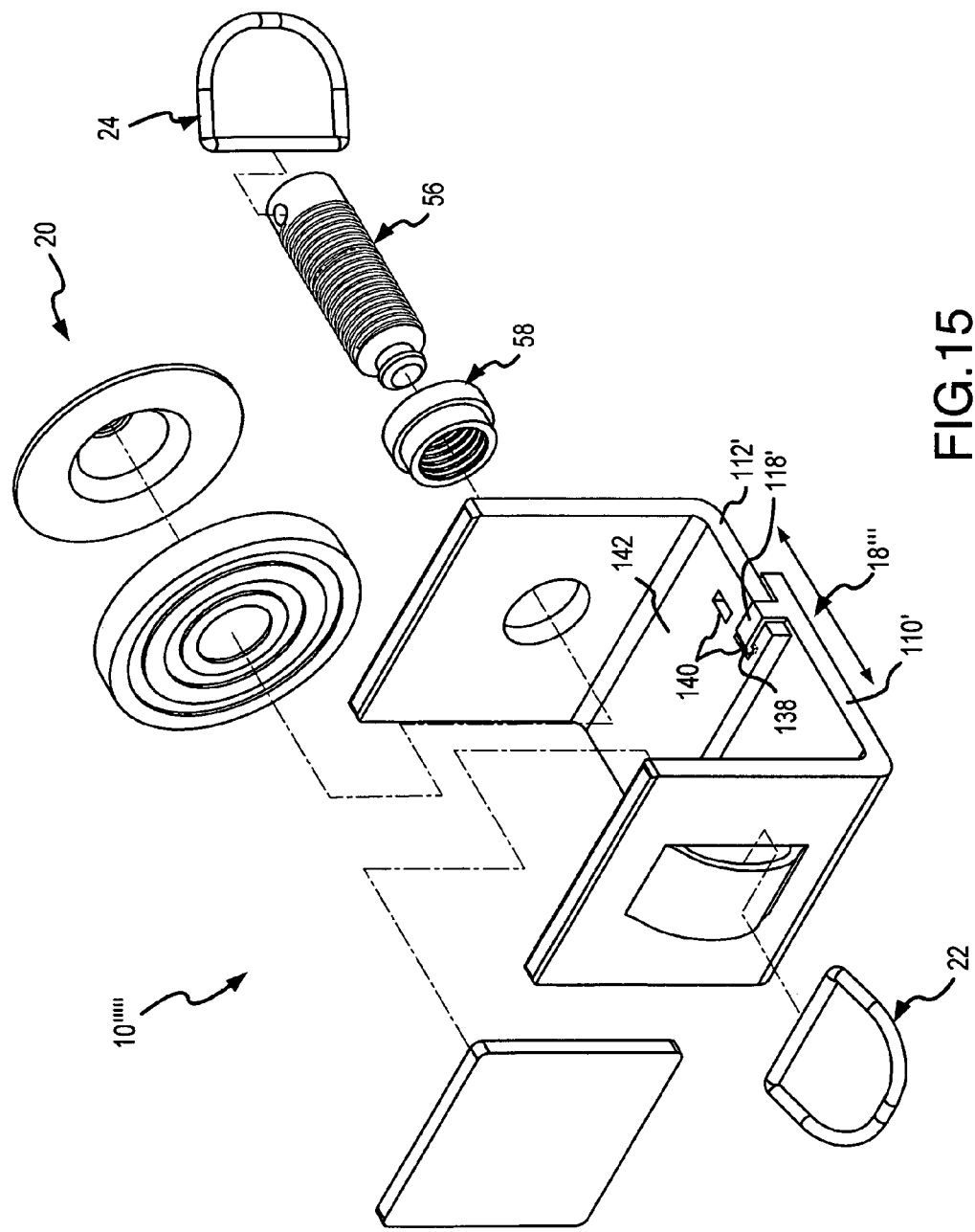
FIG. 15 is an exploded isometric view of a fifth alternative embodiment of a tie-out according to the present invention.

A fifth alternative embodiment of a tie-out 10'"" is shown in FIG. 15. The tie-out base 18'" utilizes the first piece 110' and a second piece 112' similar to the embodiment described with reference to FIG. 12. However, the tabs 118' (one of which is shown in FIG. 15) on the first piece 110' in FIG. 15 also have width adjustment fixing tabs 138 extending therefrom, and a plurality of corresponding width adjustment fixing slots or indentations 140 are located in an inner top surface 142 of the second piece 112'. The pieces 110', 112' are held in a fixed position relative to each other by the width adjustment fixing tabs 138, which are configured to fit snugly into any one of the plurality of corresponding width adjustment fixing slots 140. The user can make larger tie-out width adjustments by changing the slots 140 in which the tabs 138 are engaged. The pressing mechanism 20 is the same configuration as described with reference to FIG. 9, and the user can make fine adjustments to the tie-out width by screwing the screw bolt 56 in or out of the nut 58.

In yet another alternative embodiment of the present invention (not shown), the tie-out base does not include the second side and the third side. The tie-out base comprises only the first side 26 and the first ring 22 as previously described with reference to FIGS. 1–11. In this latter embodiment, the tie-out is mounted to the door by any suitable means, such as with adhesive, bolts, or screws.

Although various embodiments of this invention have been described above with a certain degree of particularity or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A pet tie-out, comprising:
   a base defining a U-shape including a first side and a second side, both connected with and separated by a third side;
   a ring hook member connected with and protruding from the first side of the base and defining a gap between the ring hook member and the first side;
   a first ring extending through the gap between the ring hook member and the first side;
   a screw bolt having a first end portion and a second end portion, the screw bolt threadedly engaged with the second side; and
   a second ring connected with the first end portion of the screw bolt.

2. The pet tie-out of claim 1, further comprising a base pad connected with the first side of the base.

3. The pet tie-out of claim 1, further comprising a press platform connected with the second end portion of the screw bolt.

4. The pet tie-out of claim 3, further comprising a platform pad connected with the press platform.

5. The pet tie-out of claim 1, further comprising a nut connected with the second side of the base, and wherein the screw bolt is threadedly engaged with the nut.

6. The pet tie-out of claim 1, wherein the second ring extends through an aperture in the first end portion of the screw bolt.

7. The pet tie-out of claim 1, wherein the first ring defines a D-shape.

8. The pet tie-out of claim 1, wherein the second ring defines a D-shape.

9. The pet tie-out of claim 8, further comprising a press platform connected with the second end portion of the screw bolt.

10. The pet tie-out of claim 9, further comprising a platform pad connected with the press platform.

11. A pet tie-out, comprising:

a base defining a U-shape including a first side and a second side, both connected with and separated by a third side;

a ring hook member connected with the first side;

a first ring connected with the ring hook member;

a screw bolt having a first end portion and a second end portion and having an aperture in the first end portion, the screw bolt threadedly engaged with the second side of the base; and a second ring extending through the aperture in the first end portion of the screw bolt.

12. The pet tie-out of claim 11, wherein the ring hook member protrudes from the first side of the base to define a gap between the ring hook member and the first side, and wherein the first ring extends through the gap.

13. The pet tie-out of claim 11, further comprising a base pad connected with the first side of the base.

14. The pet tie-out of claim 11, further comprising a nut connected with the second side the base, and wherein the screw bolt is threadedly engage with the nut.

15. The pet tie-out of claim 11, wherein the first ring defines a D-shape.

16. The pet tie-out of claim 11, wherein the second ring defines a D-shape.

* * * * *